Jan. 20, 1931.  T. SKINNER  1,789,885

COAL CHUTE

Filed March 9, 1929

Inventor:
THOMAS SKINNER
By Henry L. Chenery
Attorney.

Patented Jan. 20, 1931

1,789,885

UNITED STATES PATENT OFFICE

THOMAS SKINNER, OF SOUTH PORTLAND, MAINE

COAL CHUTE

Application filed March 9, 1929. Serial No. 345,635.

My invention relates, generally, to chutes—a channel-shaped device extensively employed when making delivery of coal, grain, or other commodities susceptible of being conveyed by sliding along the inclined surface of the device to the bin or receptacle in which the particular material being handled is to be stored.

An object of my present invention is to supply a chute particularly adapted for use when unloading coal from teams or trucks, the chute having associated therewith novel means to prevent disfigurement of the side of the building caused, in the case of the ordinary chute, by displacement of the coal therefrom as it bounces along on its course to the coal bin and is thrown or deflected against the wall of the house.

Another object is to provide a stop member to hold the chute against further movement inwardly when once positioned in its proper place in the window opening.

Another object is to support the outward end of the chute on a suitable prop so as to hold it at the correct inclination to insure easy movement of the material along its surface.

And a still further object is to embody in a unitary structure a combination of elements possessing in operation, and collectively, the foregoing advantages, and which may be folded compactly when being transported.

With these and other objects in view, the invention consists, primarily, in the novel construction and arrangement of parts capable of accomplishing the hereinbefore mentioned objects; and for the purpose of illustrating my invention I have prepared the accompanying drawing in which like reference characters are employed to identify corresponding parts in all views thereof.

In the drawing—

Figure 1:
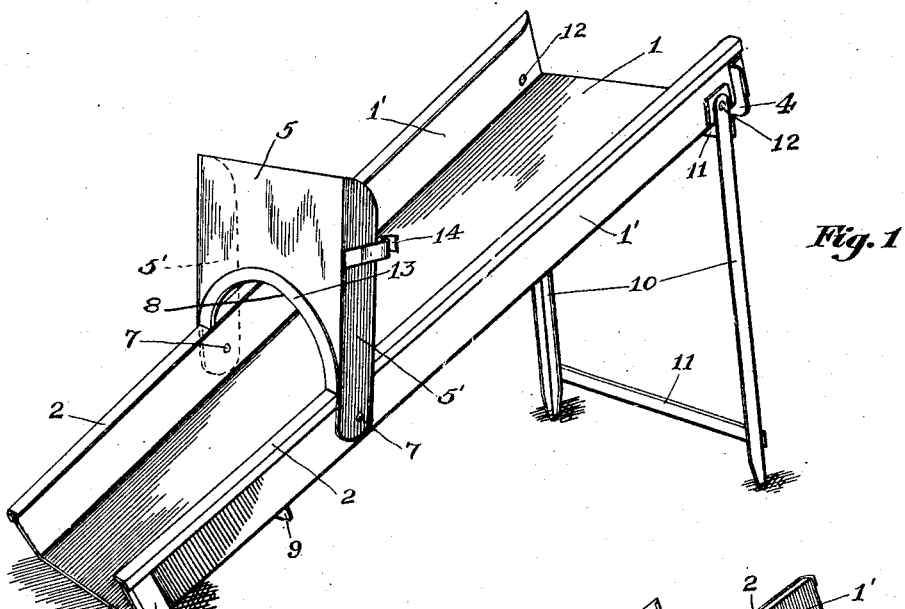
Fig. 1 and Fig. 2 are perspective views of the chute as viewed from its lower and upper ends, respectively, when arranged in operative position.

Referring to the drawings, 1 is the floor or bottom of the chute, converging slightly toward the exit or delivery end thereof. 1' represents the sides which, preferably, are made integral with the bottom. Stiffening elements are provided in the form of the angle irons 2 which are secured by electric welding or by riveting to the top edges of the sides 1', the lateral leg of the angle extending inwardly.

I further strengthen the chute by means of bands 3 and 4 which increases its ability to withstand hard usage.

Located at a suitable point along the length of the chute, nearer the delivery than the receiving end, is a swingingly mounted deflector plate 5 on each side of which wings 5' extend toward the wider or receiving end of the chute. The wings are extended to embrace the sides of the chute and are pivotally connected thereto at 7.

The deflector plate is cut away at 8, leaving an arcuate opening through which a portion of the coal bounding lightly from the main body of coal may pass uninterruptedly to the bin. But lighter and smaller portions of the coal, and the dust therefrom, rise farther from the moving mass and would, under ordinary conditions, strike against the building, but are in the present instance impacted against the transverse portion of the deflector and drop back into the chute—the lateral wings assisting by preventing more or less of the material falling off the sides of the chute on to the ground.

When the chute, incident to unloading the coal, is being placed in position, the smaller end, under normal conditions, projects through the window opening in the building until the stop-plate 9 abuts on the window sill. This limits the movement inwardly of the chute.

Figure 2:
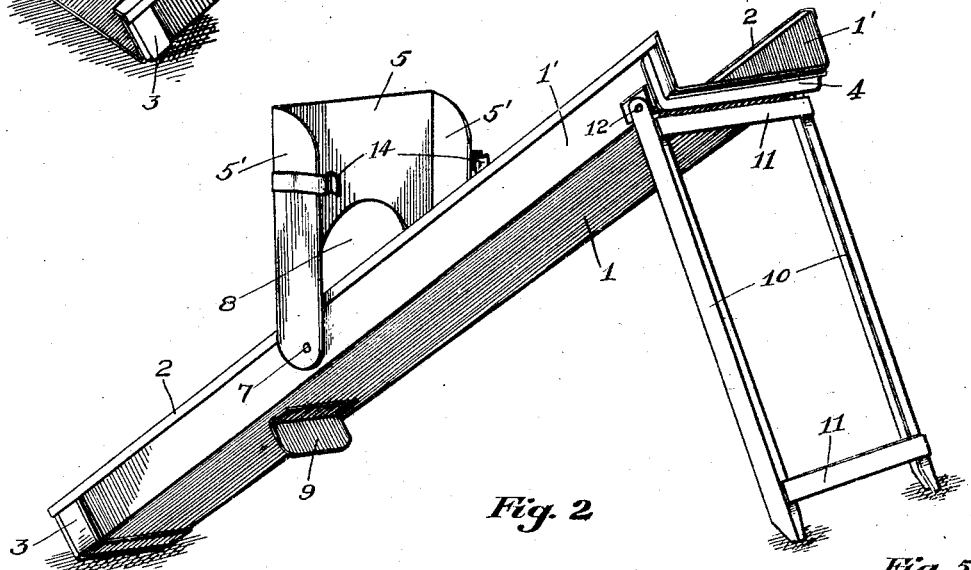

The frame which, preferably, is constructed of two legs 10 suitably braced by cross members 11, is hinged or pivoted to the sides of the chute at 12, and when the chute is being operated it stands as seen in Figs. 1 and 2, with the deflector plate in close proximity to the wall of the building.

My chute is constructed on what might be termed a "semi-knock-down" principle—that is, the parts may be folded and brought into compact shape while yet they are undetached, one from the others. The deflector plate wings 5' are pivotally secured to the upstanding sides of the chute by being quite tightly riveted thereto, and by reason of the fact that the sides of the chute are tapering, relatively, this method of attachment provides all that is necessary to prevent accidental closing of the deflector which would involve a movement toward the position of the deflector shown in Fig. 3.

Figure 4:
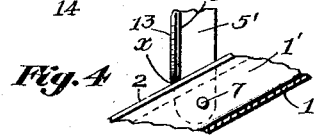
Fig. 4 is a fragmentary longitudinal section through the floor of the chute, showing means to check further swinging of the deflector plate when raised to its operative position.

But to guard against movement of the deflector in the other direction—or towards the building when the chute is in operative position, I provide a construction which I illustrate in Figs. 1 and 4 in which a semi-circular reinforcing plate 13, surrounding the upper side of the space 8, is secured, preferably by welding, to the deflector. The ends of this half ring plate abut on the tops of the angle irons 2 and provide positive movement-limiting stops, as seen at $x$, Fig. 4.

On the angle at which the legs 10 are placed, relative to the chute 1, depends the facility with which the coal, or other commodity, slides off its floor or bottom, and as constructed, the device is susceptible of more or less variation in this angle of inclination.

In most instances the legs find lodgement in comparatively soft earth and therefore provide sufficient stability to the structure.

Should the legs, however, stand on cement or other smooth and slippery surfaces, the reinforcing element 4 may be employed to restrict their outward movement—the upper cross member 11 contacting with the member 4 to accomplish this purpose.

Figure 3:
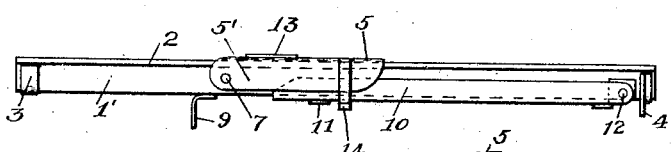
Fig. 3 is a side elevation of the chute shown with the parts folded for transportation.
Figure 5:
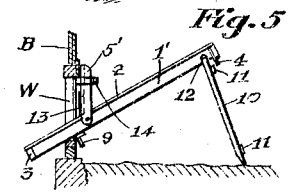
Fig. 5 illustrates the device, on a much reduced scale, as it is used in practical operation.

The illustration in Fig. 3 presents the chute as a very compact, conveniently handled piece of apparatus, easily carried about from place to place; and in Fig. 5 it is shown operatively located in a window W in the wall B of a building. When folded as seen in Fig. 3, the side, latch members 14 clasp around the legs 10 and hold the parts in compact shape to transport.

The parts are fabricated, except where pivotal connections are required, by electric welding—the material being black iron subsequently galvanized. In this way a very durable piece of merchandise is supplied.

The apparatus is capable of saving considerable time on the part of the teamster or truckman delivering the coal by obviating the necessity, usually falling on him when operating with the ordinary chute, of cleaning defaced walls of buildings and collecting coal dropped from the chute on to lawns or grounds surrounding the house. Furthermore, much time ordinarily is consumed by the teamster in locating boxes or barrels on which to prop up one end of the ordinary chute—all of which is eliminated by the employment of my improved chute.

What I claim is:

1. In a device of the character described comprising a tapered channel shaped chute, having foldable legs supporting one end of said chute, a deflector plate having lateral portions pivoted to the sides of said chute, a reinforcing plate secured to the lower transverse portion of said deflector plate, the ends thereof extending inwardly to impinge on the top edges of the respective sides of said chute when in operative position, and means to secure said deflector plate flatwise against the edges of the sides of said chute when folded thereupon.

2. In a device of the character described comprising a tapered channel shaped chute having pivotally attached legs to support one end thereof, a deflector plate having lateral portions disposed at right angles to its transverse portion, said lateral portions being eccentrically pivoted to the respective sides of said chute, a reinforcing member secured to the lower transverse portion of said deflector plate, the ends thereof adapted to impinge on the top edges of the respective sides of said chute and limit the rotary movement of said deflector plate in one direction, and a latch secured to said deflector plate and adapted to hold said deflector plate flatwise against the edges of the sides of said chute when folded thereupon.

3. In a device of the character described comprising a tapered channel shape chute having foldable legs supporting one end thereof, a deflector plate including a transverse portion and two lateral portions eccentrically pivoted to the respective sides of said chute, a reinforcing member secured to the transverse portion of said deflector plate, the ends of said member adapted to engage the top edges of the sides of said chute and prevent further rotary movement of said deflector plate in a direction toward the narrower end of said chute, and a latch member fixed on each side of said deflector plate adapted to engage, respectively, the said legs when said deflector plate and said legs are folded against the upper and under sides, respectively of said chute.

In testimony whereof I affix my signature.

THOMAS SKINNER.